United States Patent
Oh

(10) Patent No.: US 11,505,073 B1
(45) Date of Patent: Nov. 22, 2022

(54) METHOD FOR CONTROLLING DRIVING FORCE OF VEHICLE

(71) Applicants: HYUNDAI MOTOR COMPANY, Seoul (KR); KIA CORPORATION, Seoul (KR)

(72) Inventor: Ji Won Oh, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/733,141

(22) Filed: Apr. 29, 2022

(30) Foreign Application Priority Data

Sep. 27, 2021 (KR) .......... 10-2021-0126990

(51) Int. Cl.
*B60T 1/00* (2006.01)
*B60L 15/20* (2006.01)
*B60W 10/08* (2006.01)

(52) U.S. Cl.
CPC ............ *B60L 15/20* (2013.01); *B60W 10/08* (2013.01); *B60L 2240/423* (2013.01); *B60W 2710/085* (2013.01)

(58) Field of Classification Search
CPC ............ B60L 12/20; B60L 2240/423; B60L 2240/463; B60W 10/06; B60W 10/08
See application file for complete search history.

(56) References Cited

U.S. PATENT DOCUMENTS

| | | | |
|---|---|---|---|
| 5,973,463 A | 10/1999 | Okuda et al. | |
| 2008/0183353 A1* | 7/2008 | Post | B60W 10/184 701/84 |
| 2012/0101691 A1* | 4/2012 | Otsuka | F02D 11/105 701/48 |
| 2013/0253793 A1* | 9/2013 | Lee | B60W 50/029 701/70 |
| 2014/0358369 A1* | 12/2014 | Anderfaas | B60W 30/045 701/37 |
| 2015/0019103 A1* | 1/2015 | Choi | G05D 1/027 901/1 |
| 2016/0159225 A1* | 6/2016 | Nakatsu | B60L 15/2009 701/70 |
| 2020/0017139 A1* | 1/2020 | Ramanujam | B62D 5/0481 |

(Continued)

FOREIGN PATENT DOCUMENTS

| | | |
|---|---|---|
| JP | 2005-223970 A | 8/2005 |
| JP | 2009-055703 A | 3/2009 |

(Continued)

*Primary Examiner* — John Kwon
(74) *Attorney, Agent, or Firm* — Morgan, Lewis & Bockius LLP

(57) ABSTRACT

A method for controlling driving force of a vehicle includes: determining, by a controller, a basic torque command on the basis of vehicle operation information collected while a vehicle is driven; obtaining, by the controller, tire vertical load information and vehicle pitch motion information in real time during the vehicle is driven on the basis of the information collected from the vehicle; determining, by the controller, a final torque command using the determined basic torque command and the obtained tire vertical load information and vehicle pitch motion information; and controlling, by the controller, a torque output of a driving device configured to drive the vehicle according to the determined final torque command.

16 Claims, 6 Drawing Sheets

(56) References Cited

U.S. PATENT DOCUMENTS

2021/0078557 A1\* 3/2021 Kobune ................ B60T 13/741
2021/0199539 A1\* 7/2021 Matsumoto ........... G01M 17/06

FOREIGN PATENT DOCUMENTS

| KR | 10-0640175 B1 | 11/2006 |
|----|---------------|---------|
| KR | 10-2009-0062321 A | 6/2009 |
| KR | 10-1912451 B1 | 1/2019 |
| KR | 10-2079940 B1 | 2/2020 |

\* cited by examiner

METHOD FOR CONTROLLING DRIVING FORCE OF VEHICLE

CROSS REFERENCE TO RELATED APPLICATION

The present application is based on and claims the benefit of priority to Korean Patent Application No. 10-2021-0126990, filed Sep. 27, 2021, the entire contents of which is incorporated herein by reference.

TECHNICAL FIELD

The present disclosure relates to a method for controlling driving force of a vehicle. More particularly, the present disclosure relates to a method configured to solve a problem of a repeated occurrence phenomenon of slip and deterioration of wheel slip control performance due to a pitch motion by controlling the driving force of the vehicle by reflecting the pitch motion and tire vertical load information on the vehicle in real time in advance.

BACKGROUND

Despite the recent introduction of various electronic control devices into vehicles, behavior of the vehicle is fundamentally limited by frictional force on a road. This is because the behavior of the vehicle is affected by frictional force between the tires and a road surface. Therefore, how effectively the frictional force may be used is an important factor in determining the behavior of the vehicle.

In order to effectively use the frictional force, it is important to control driving force of vehicle wheels to not exceed the frictional force that the road surface may provide. Here, the frictional force that the road surface may provide is complexly affected by road surface characteristics, an amount of longitudinal/lateral tire slip, a tire vertical load, and the like. Of these, the factor that directly determines the road surface frictional force is the tire vertical load.

In general, as a method of using frictional force, an electronic control device such as an anti-lock braking system (ABS) and a traction control system (TCS) is used to limit tire slip. However, the ABS and TCS control methods have disadvantages of not effectively exhibiting slip control performance due to problems such as control cycle delay or wheel speed signal processing to prevent malfunction.

According to a recent trend of wheel slip control strategies in electrified vehicles, many methods of using torque and speed of a motor based on fast motion of the motor rather than using vehicle body reference speed and wheel speed are being proposed.

Such a strategy has the advantage that it does not require an absolute or reference speed of the vehicle, so it may be effective in an e-4WD (4WD: Four Wheel Drive) system. However, when the control that reflects the information on a real-time changing suspension pitch motion and the resulting changed tire vertical load is not performed, the vehicle may encounter a limitation in which a situation requiring driving force reduction control occurs repeatedly due to a limitation of feedback control.

For example, when front-wheel driving force is generated, the vehicle pitch angle increases, and then the vertical load on the front-wheel decreases, so that tire slip may occur at the front-wheel. At this time, when the TCS operates and the front-wheel driving force is reduced, amount of the tire slip of the front-wheels is reduced and the pitch angle of the vehicle is reduced, so that the vertical load on the front-wheels may be secured again. Then, when the front-wheel driving force is increased again, the pitch angle of the vehicle increases again, and the vertical load on the front-wheel decreases again, which may cause tire slip of the front-wheel again.

The foregoing is intended merely to aid in the understanding of the background of the present disclosure and is not intended to mean that the present disclosure falls within the purview of the related art that is already known to those skilled in the art.

SUMMARY

Accordingly, the present disclosure has been made keeping in mind the above problems occurring in the related art. An objective of the present disclosure is, by controlling the driving force of the vehicle by reflecting the pitch motion information on the vehicle in real time in advance, to provide a way to solve the problem of a repeated occurrence phenomenon of slip and deterioration of wheel slip control performance, due to a pitch motion.

In addition, the objective of the present disclosure is not limited to the objective mentioned above, and other objectives not mentioned could be clearly understood by those (hereinafter referred to as "person of ordinary skill") of ordinary skill in the art to which the present disclosure belongs from the description below.

In order to achieve the above objective, according to one aspect of the present disclosure, there may be provided a method for controlling driving force of a vehicle, the method including: determining, by a controller, a basic torque command on a basis of vehicle operation information collected while the vehicle is travelling; obtaining, by the controller, tire vertical load information and vehicle pitch motion information in real time on a basis of information collected from the vehicle while the vehicle is traveling; determining, by the controller, a final torque command using the determined basic torque command and the obtained tire vertical load information and vehicle pitch motion information; and controlling, by the controller, a torque output of a driving device configured to drive the vehicle according to the determined final torque command.

In some embodiments, the determining of the final torque command may include determining, by the controller, a front-wheel torque upper limit value and a rear-wheel torque upper limit value using the tire vertical load information; determining, by the controller, a front-wheel torque command and a rear-wheel torque command distributed according to a power distribution ratio determined from the basic torque command; and determining, by the controller, a smaller value of the determined front-wheel torque command and the determined front-wheel torque upper limit value as a final front-wheel torque command for controlling a torque output of a front-wheel driving device, and determining, by the controller, a smaller value of the determined rear-wheel torque command and the determined rear-wheel torque upper limit value as a final rear-wheel torque command for controlling a torque output of a rear-wheel driving device.

In some embodiments, the tire vertical load information may include a front-wheel vertical load and a rear-wheel vertical load, and in the determining of the front-wheel torque command and the rear-wheel torque command, the power distribution ratio may be determined to be a ratio of the front-wheel vertical load to the rear-wheel vertical load.

In some embodiments, in the determining of the front-wheel torque command and the rear-wheel torque command, the power distribution ratio may be determined to be a ratio of the determined front-wheel torque upper limit value to the determined rear-wheel torque upper limit value.

In some embodiments, the tire vertical load information may include a front-wheel vertical load and a rear-wheel vertical load, and the controller may be configured to determine: the front-wheel torque upper limit value from the front-wheel vertical load and the obtained vehicle pitch motion information; and the rear-wheel torque upper limit value from the rear-wheel vertical load and the obtained vehicle pitch motion information.

In some embodiments, the vehicle pitch motion information may include a vehicle pitch angle that is a pitch direction angle of the vehicle, and a pitch angle change rate that is a rate of change of the vehicle pitch angle, and the front-wheel torque upper limit value and the rear-wheel torque upper limit value may be determined by Equations 1 and 2, respectively, below:

Front-wheel torque upper limit=σ1×front-wheel vertical load−σ2×pitch angle−σ3×pitch angle change rate, [Equation 1]

Rear-wheel torque upper limit=σ1×Rear-wheel vertical load−σ2×Pitch angle−σ3×Pitch angle change rate, [Equation 2]

where σ1 is a parameter value correspondingly determined to a maximum frictional coefficient of a road surface, and σ2 and σ3 are values preset to the controller.

In some embodiments, the determining of the final torque command may include determining, by the controller, a front-wheel torque command and a rear-wheel torque command distributed according to a power distribution ratio determined from the basic torque command; and determining, by the controller, a final front-wheel torque command for controlling a torque output of a front-wheel driving device and a final rear-wheel torque command for controlling a torque output of a rear-wheel driving device using the determined front-wheel torque command, the determined rear-wheel torque command, the obtained tire vertical load information, and the obtained vehicle pitch motion information.

In some embodiments, the tire vertical load information may include a front-wheel vertical load and a rear-wheel vertical load, and in the determining of the front-wheel torque command and the rear-wheel torque command, the power distribution ratio may be determined to be a ratio of the front-wheel vertical load to the rear-wheel vertical load.

In some embodiments, the tire vertical load information may include a front-wheel vertical load and a rear-wheel vertical load, the vehicle pitch motion information may include a vehicle pitch angle that is a pitch direction angle of the vehicle, and a pitch angle change rate that is a rate of change of the vehicle pitch angle, and the final front-wheel torque command and the final rear-wheel torque command may be determined by Equations 3 and 4, respectively, below:

Final front-wheel torque command=Front-wheel torque command before correction+σ1×(Basic front-wheel vertical load−Current front-wheel vertical load)−σ2×Pitch angle−σ3×Pitch angle change rate, [Equation 3]

Final rear-wheel torque command after correction=Rear-wheel torque command before correction+σ1×(Basic rear-wheel vertical load−Current rear-wheel vertical load)−σ2×Pitch angle−σ3×Pitch angle change rate, [Equation 4]

where σ1 is a parameter value correspondingly determined to a maximum frictional coefficient of a road surface, and σ2, σ3, the basic front-wheel vertical load, and the basic rear-wheel vertical load are values preset to the controller.

In some embodiments, the determining of the final torque command may include determining, by the controller, a front-wheel torque upper limit value and a rear-wheel torque upper limit value using the tire vertical load information; determining, by the controller, a front-wheel torque command and a rear-wheel torque command distributed according to a power distribution ratio determined from the basic torque command; determining, by the controller, a smaller value of the determined front-wheel torque command and the determined front-wheel torque upper limit value as a front-wheel torque command before correction, and determining, by the controller, a smaller value of the determined rear-wheel torque command and the determined rear-wheel torque upper limit value as a rear-m wheel torque before correction; and determining, by the controller, a final front-wheel torque command for controlling a torque output of a front-wheel driving device and a final rear-wheel torque command for controlling a torque output of a rear-wheel driving device by using the determined front-wheel torque command before correction, the determined rear-wheel torque command before correction, the obtained tire vertical load information, and the obtained vehicle pitch motion information.

In some embodiments, in the controller, the front-wheel torque upper limit value and the rear-wheel torque upper limit value may be determined by Equations 5 and 6, respectively, below:

Front-wheel torque upper limit=σ1×front-wheel vertical load, [Equation 5]

Rear-wheel torque upper limit=σ1×rear-wheel vertical load, [Equation 6]

where σ1 is a parameter value correspondingly determined to a maximum frictional coefficient of a road surface.

In some embodiments, the tire vertical load information may include a front-wheel vertical load and a rear-wheel vertical load, the vehicle pitch motion information may include a vehicle pitch angle that is a pitch direction angle of the vehicle, and a pitch angle change rate that is a rate of change of the vehicle pitch angle, and the final front-wheel torque command and the final rear-wheel torque command may be determined by Equations 7 and 8, respectively, below:

Final front-wheel torque command=Front-wheel torque command after applying the torque upper limit of Equation 5−σ2×Pitch angle−σ3× Pitch angle change rate, [Equation 7]

Final rear-wheel torque command=Rear-wheel torque command after applying the torque upper limit of Equation 6−σ2×Pitch angle−σ3×Pitch angle change rate, [Equation 8]

where σ1 is a parameter value as determined according to a maximum frictional coefficient of a road surface, and σ2 and σ3 are values preset to the controller.

In some embodiments, the vehicle pitch motion information may include a vehicle pitch angle that is a pitch direction angle of the vehicle and a pitch angle change rate that is a rate of change of the vehicle pitch angle.

In some embodiments, the vehicle pitch angle may be a suspension pitch angle that is an angle in the vehicle pitch direction according to strokes of a front-wheel suspension and a rear-wheel suspension.

In some embodiments, the obtaining of the tire vertical load information and the vehicle pitch motion information in real time may include obtaining, by a transfer function preset to the controller, the tire vertical load information and the vehicle pitch motion information, where the transfer function uses the information collected from the vehicle as input.

In some embodiments, the determining of the final torque command may include: determining, by the controller, a driving wheel torque upper limit value using tire vertical load information of a driving wheel that is any one of a front-wheel and a rear-wheel of the vehicle; comparing, by the controller, the determined basic torque command and the determined driving wheel torque upper limit value; and determining, by the controller, the basic torque command as the final torque command when the basic torque command is no greater than the driving wheel torque upper limit value, and determining, by the controller, the driving wheel torque upper limit value as the final torque command when the basic torque command exceeds the driving wheel torque upper limit value.

Accordingly, according to a method for controlling driving force of a vehicle according to the present disclosure, it is possible to perform driving force reduction control using real-time vertical load information before wheel slip occurs, and an excessive noseup phenomenon of the vehicle may be prevented therethrough. In addition, driving force control in consideration of real-time pitch angle mechanics may be implemented, and the noseup overshoot phenomenon (fluctuation) may be prevented therethrough, and in particular, it is more effective when applied to Sports Utility Vehicle (SUV) with a long distance between the center of gravity and the center of pitch.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
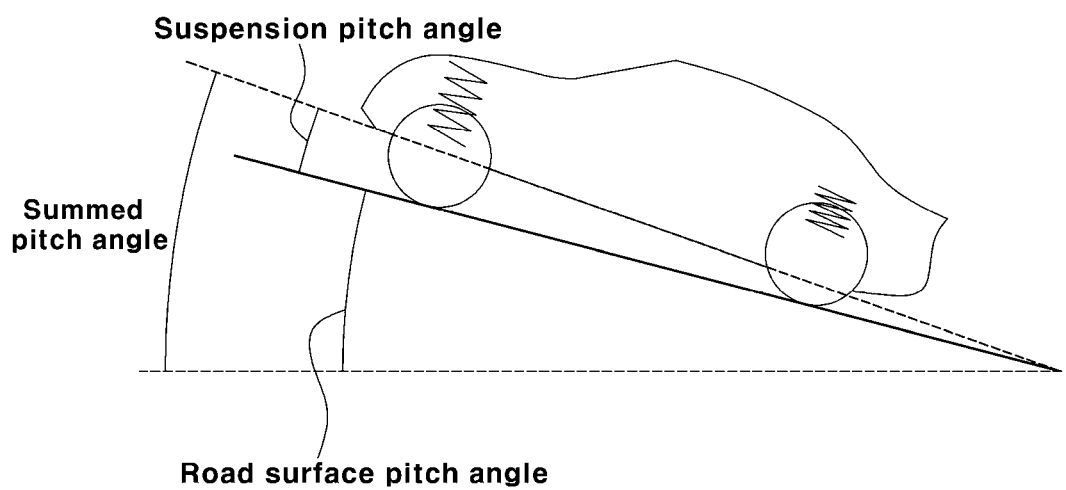
FIG. 1 is a view illustrating pitch angles in a vehicle.

Specific structural or functional descriptions presented in embodiments of the present disclosure are only exemplified for the purpose of describing the embodiments according to the concept of the present disclosure, and the embodiments according to the concept of the present disclosure may be implemented in various forms. In addition, the present disclosure should not be construed as being limited to the embodiments described herein and should be understood to include all modifications, equivalents, and substitutes included in the spirit and scope of the present disclosure.

Meanwhile, in the present disclosure, terms such as "first," "second," and/or the like may be used to describe various components, but the components are not limited to the above terms. The above terms are used only for the purpose of distinguishing one component from other components, for example, within the scope not departing from the scope of the rights according to the concept of the present disclosure, the first component may be referred to as the second component, and similarly, the second component may also be referred to as the first component.

When a component is referred to as being "coupled" or "connected" to another component, it should be understood that the component may be directly coupled or connected to another component, but other components may exist in between. On the other hand, when a component is referred to as being "directly connected" or "in direct contact with" another component, it should be understood that no other component is present in between. Other expressions for describing the relationship between elements, that is, expressions such as "between" and "immediately between" or "adjacent to" and "directly adjacent to", should be interpreted similarly.

Like reference numerals refer to like components throughout the specification. The terminology used herein is for the purpose of describing the embodiments, and is not intended to limit the present disclosure. In the present specification, the singular includes the plural unless specifically stated in the phrase. As used herein, "comprises" and/or "comprising" means that the presence of one or more unrecited components, steps, operations, and/or elements is not excluded in addition to the stated component, step, operation, and/or element.

The present disclosure relates to a method for controlling a driving force of a vehicle and is to provide a way, by controlling the driving force of the vehicle by reflecting the pitch motion information on the vehicle in real time in advance, to solve a problem of a repeated occurrence phenomenon of slip and deterioration of wheel slip control performance, due to a pitch motion.

In the present disclosure, information on a suspension pitch angle of the vehicle and the tire vertical load is used in order to control the driving force applied to the driving wheels by the driving device and the braking device of the vehicle. The driving force in the present disclosure is a force generated by a driving device configured to drive a vehicle and may be a force that is a sum of force acting between the tires of the driving wheels and the road surface.

The driving force in the present disclosure may include force generated to the driving wheels by a driving device (for example, a motor), and the force generated to the driving wheels may be due to a torque applied to the driving wheels by the driving device.

Specifically, when the driving device of the vehicle is a motor, the torque applied to the driving wheels becomes a driving torque output when the motor is driven or becomes a regenerative braking torque by the motor during regeneration. In this case, the driving force is driving force of a concept including not only a driving force output when the motor is driven but also a regenerative braking force when the motor is regenerated.

In addition, the control of the driving force may be performed by controlling the torque of the driving device. In this case, the torque is torque applied to the driving wheels, meaning both the driving torque by the motor and the regenerative braking torque by the motor. In addition, in the following description, "torque" and "torque command" may be replaced with "driving force" and "driving force command", respectively.

An existing driving force control method for suppressing wheel slip is a feedback control method that implements correction of the driving force after the wheel slip has already occurred. However, in the present disclosure, the tire vertical load information before wheel slip occurs is used, and the size of the driving force is adjusted in real time in response to a change in the tire vertical load.

One of the most direct factors that determine a limit of grip force between the road surface and the tire is the tire vertical load. As the tire vertical load increases, the available grip force increases, making it difficult to cause wheel slip, and as the tire vertical load decreases, the available grip force also decreases, making a state vulnerable to wheel slip.

There are many reasons the tire vertical load changes, and it is difficult to control the driving force by considering up to even all disturbances among them. Therefore, except for the disturbances, the change in the tire vertical load caused by at least the driving force itself is worth considering in the driving force control process.

When a driving force is generated in the vehicle, pitching moment is generated due to a difference between a center of gravity and a pitch center of the vehicle, and the pitch motion of the vehicle is excited. Accordingly, the pitch angle is generated by the mechanical characteristics of a suspension and the vehicle body.

In general, a pitch angle increases when a vehicle accelerates, and a vehicle state at this time is referred to as a noseup motion or a squat state. In addition, when the vehicle decelerates, the pitch angle decreases, which is referred to as a nosedown motion or a dive state.

When such a pitch motion of the vehicle occurs, the suspension of the vehicle is contracted or stretched. Accordingly, a spring or damper of the suspension is displaced, thereby affecting the tire vertical load.

A tire vertical load being changed as such changes the limit of the grip force by being interlocked with an occurrence of the pitch motion. Therefore, when the limit of the driving force is set in consideration of such a change in advance, torque reduction control may be performed in advance before wheel slip occurs.

In addition, since proper torque reduction control in an acceleration situation reduces the noseup phenomenon, when such a principle is used to adjust a pitch angle change rate (pitch rate), a role of attenuating the pitch motion of the vehicle may be expected. Here, the pitch motion considers, not the road surface pitch angle, only the suspension pitch angle, and a definition of the suspension pitch angle is as shown in FIG. 1.

FIG. 1 is a view illustrating pitch angles in a vehicle. As shown, the pitch angle in the vehicle may be divided into a suspension pitch angle and a road surface pitch angle, and the sum of the suspension pitch angle (absolute value) and the road surface pitch angle (absolute value) may be defined as the summed pitch angle.

In the following description, a stroke difference between a front suspension and a rear suspension occurs, so that when the front suspension is in a state more rebounded (tensioned) compared to the rear suspension, and the rear suspension is in a state more bumped (contracted) compared to the front suspension, the suspension pitch angle in the state may be defined as a positive (+) suspension pitch angle. In this case, the suspension pitch angle of the vehicle state illustrated in FIG. 1 is a positive value.

The road surface pitch angle corresponds to a longitudinal inclination of the vehicle due to an inclination of the road surface, and the suspension pitch angle is the longitudinal (pitch direction) inclination of the vehicle caused by tension and contraction of the front- and rear-wheel suspensions. In a typical vehicle, the road surface pitch angle (road gradient) may be detected through a longitudinal acceleration sensor.

The information (information on the suspension pitch angle) on the suspension pitch angle shown in FIG. 1 in the vehicle is information indicating a pitch direction vibration state of the vehicle according to the strokes of the front suspension and rear suspension while the vehicle is running and may be one obtained in real time through a sensor of the suspension or estimated one based on information collected through a sensor in the vehicle.

A method of obtaining information on the suspension pitch angle through a sensor of a suspension in a vehicle is a known technique. For example, by using a travel sensor of the front suspension and a travel sensor of the rear suspension, the information on the suspension pitch angle of the vehicle may be calculated in real time by comparing the positions of the front- and rear-wheels on the basis of the signals from the position sensors.

In addition, a method of estimating information on the suspension pitch angle is also a known technique. That is, a method of obtaining a pitch angle by integrating a signal of a pitch rate sensor or estimating kinematically on the basis of a longitudinal or vertical direction acceleration sensor value is known. In addition, there are known methods such as a method of estimating the pitch angle through a suspension model-based observer, a method of calculating the pitch angle through a wheel speed information and driving force information model, a method of observing the pitch angle information by a sensor fusion method by integrating these methods, and the like.

The vehicle state shown in FIG. 1 may be said to indicate a direction in which the suspension pitch angle is a positive (+) value, and in this case, the vehicle may be said to be in a squat state on the basis of the suspension pitch angle. Contrary to FIG. 1, when the suspension pitch angle indicates a negative (−) value direction, the vehicle may be said to be in a dive state on the basis of the suspension pitch angle.

In addition, since the vehicle state shown in FIG. 1 is a state in which the vehicle body is inclined to the rear, it may be said to be a squat state even on the basis of the vehicle body. A squat state (body squat state) based on the vehicle body may be said to be a state in which the vehicle body tilts backward on the basis of a non-tilted horizontal line (inclination angle=0°). In addition, the state in which the vehicle body is inclined forward may be said to be a dive state based on the vehicle body, and the vehicle body dive state may be said to be a state in which the vehicle body is inclined forward on the basis of the horizontal line.

As described above, in the vehicle state as shown in FIG. 1, the squat state may be induced on the basis of the suspension pitch angle when the vehicle is accelerated, and the vehicle dive state may be induced on the basis of the suspension pitch angle when the vehicle is decelerated.

Figure 2:
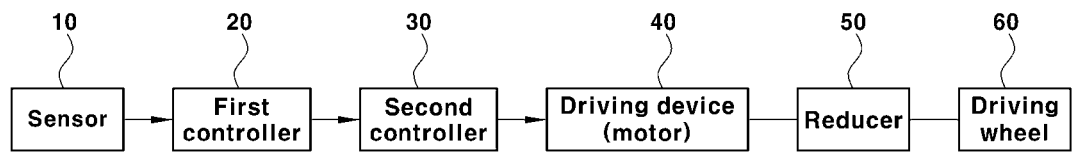
FIG. 2 is a block diagram illustrating the configuration of an apparatus configured to perform a driving force control process according to an embodiment of the present disclosure.
Figure 3:
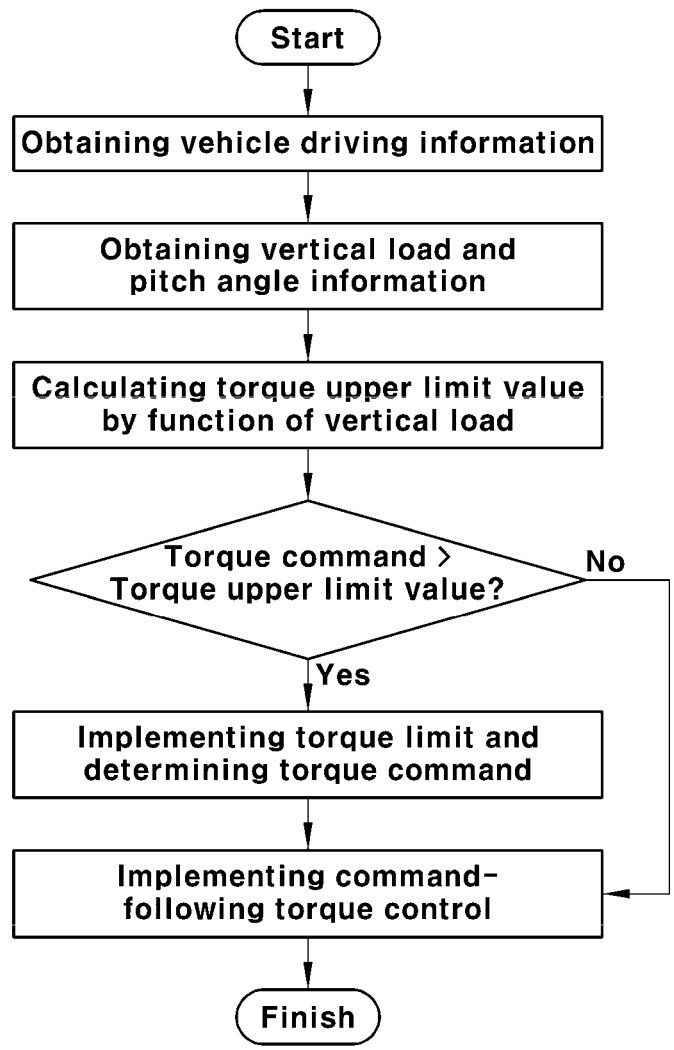
FIG. 3 is a flowchart illustrating a driving force control process of a vehicle according to the present disclosure.

FIG. 2 is a block diagram illustrating the configuration of an apparatus configured to perform a driving force control process according to an embodiment of the present disclosure, and FIG. 3 is a flowchart illustrating a driving force control process of a vehicle according to the present disclosure.

With reference to FIG. 2, an apparatus for performing driving force control according to the present disclosure includes: a first controller 20 configured to determine a basic torque command from vehicle operation information and determine and output a front-wheel torque command and a rear-wheel torque command distributed according to a power distribution ratio from the basic torque command; a second controller 30 configured to control the operation of a front-wheel driving device and rear-wheel driving device 40 according to the front-wheel torque command and the rear-wheel torque command received from the first controller 20; and the front-wheel driving device and rear-wheel driving device 40 configured to be controlled an operation (torque output) thereof by the second controller 30, as a vehicle driving source for driving the vehicle.

The driving force control method according to the present disclosure may be applied to a 4WD vehicle in which the front- and rear-wheels are driven by independent driving devices. Specifically, the driving force control method according to the present disclosure may be applied to a vehicle to which an e-4WD system in which both the front-wheel driving device and rear-wheel driving device are motors is applied, that is, an e-4WD vehicle. Alternatively, the driving force control method according to the present disclosure may be applied to a 4WD vehicle in which one of the front-wheel driving device and rear-wheel driving device is an engine and the other is a motor.

Alternatively, the driving force control method according to the present disclosure may be applied to a two wheel drive (2WD) vehicle, that is, a front-wheel driving vehicle in which the driving wheels are front-wheels or a rear-wheel driving vehicle in which the driving wheels are rear-wheels. Here, the driving device for driving the front-wheels or the rear-wheels in the 2WD vehicle may be an engine or a motor.

However, in a 2WD vehicle, the front- and rear-wheels are not distinguished during the driving force control process to be described later, and there is no distinction between the front- and rear-wheels in a torque command, a torque upper limit value, a vertical load, a wheel speed, and the like. In addition, a process in which the power distribution ratio is determined, a process (distribution and determination of the front-wheel torque command and the rear-wheel torque command) in which power is distributed between the front- and rear-wheels according to the power distribution ratio, and the like is omitted.

In the example of the e-4WD vehicle, the first controller 20 determines a basic torque command from the vehicle operation information and distributes the basic torque command into the front-wheel torque command and the rear-wheel torque command according to a predetermined power distribution ratio. Subsequently, the first controller 20 determines a final front-wheel torque command and a final rear-wheel torque command using the distributed front-wheel torque command and the rear-wheel torque command, suspension pitch angle and the tire vertical load information, and the like and then then outputs the final front-wheel torque command and the rear-wheel torque command determined above to the second controller 30.

Accordingly, the second controller 30 becomes to control the operation of the front-wheel driving device and the rear-wheel driving device according to the final front-wheel torque command and the final rear-wheel torque command output from the first controller 20. The torque and rotational force output from the front-wheel driving device and rear-wheel driving device 40 is transmitted to the front-wheel and the rear-wheel 60, which are the driving wheels, via the reducer 50 as shown in FIG. 2.

The torque command is determined and generated on the basis of vehicle operation information collected from a vehicle while being driven, wherein the vehicle operation information may be sensor-detected information that is detected by a sensor 10 and input to the first controller 20 through the vehicle network.

Here, the sensor 10 configured to detect vehicle operation information may include: an accelerator pedal sensor (APS) configured to detect a driver's accelerator pedal input value; a brake pedal position sensor (BPS) configured to detect a driver's brake pedal input value; a sensor configured to detect a driving gauge speed; and a sensor configured to detect the vehicle speed.

The driving gauge speed may be a rotation speed of the driving device 40 or a rotation speed (wheel speed) of the driving wheels 60. Here, the rotation speed of the driving device may be the rotation speed (motor speed) of the motor. In this case, the sensor configured to detect the driving gauge speed may be a sensor configured to detect the motor speed, which may be a resolver configured to detect the position of the rotor of the motor. Alternatively, the sensor configured to detect the driving gauge speed may be a wheel speed sensor configured to detect the rotation speed (wheel speed) of the driving wheel.

In addition, the sensor configured to detect the vehicle speed may also be the wheel speed sensor. Obtaining vehicle speed information from the signal of the wheel speed sensor is a well-known technique in the art, and thus a detailed description thereof will be omitted.

As vehicle operation information for determining and generating the torque command, as detected by the sensor 10, a driver's accelerator pedal input value (APS value), a driver's brake pedal input value (BPS value), a rotation speed of the driving device, a vehicle speed, and the like may be selectively used. In the vehicle operation information, the accelerator pedal input value and the brake pedal input value may be referred to as driver input information, and the speed of the driving device 40 and vehicle speed detected by such a sensor 10 may be referred to as vehicle state information.

Alternatively, the vehicle operation information may be information determined by itself by the first controller 20, or information (for example, required driving force information) input to the first controller 20 through the vehicle network from another controller (for example, ADAS controller) in the vehicle. In this case, the first controller 20 may be a vehicle control unit (VCU) or a hybrid control unit (HCU) configured to generate a torque command on the basis of vehicle operation information in an ordinary vehicle.

Further, in the embodiment of the present disclosure, the sensor 10 may further include a sensor of the suspension configured to obtain the information on the suspension pitch angle, wherein the suspension sensor configured to obtain the information on the suspension pitch angle may be the sensor including a travel sensor of the front-wheel suspension and a travel sensor of the rear-wheel suspension. As described above, a method of obtaining information on the suspension pitch angle through a sensor of the suspension is a known technique. For example, information on the suspension pitch angle of the vehicle may be calculated in real time by comparing the positions between the front-wheel and the rear-wheel on the basis of the signals from the position sensors.

In addition, as described above, the suspension pitch angle may be obtained by an estimation process determined on the basis of information collected from the vehicle through the sensor and the like, and the estimation method is well-known at the level of those skilled in the art, so a detailed description thereof will be omitted.

In the present disclosure, the suspension pitch angle information and tire vertical load information are used for driving force control, and the suspension pitch angle (hereinafter abbreviated as "pitch angle") and the tire vertical load (hereinafter abbreviated as "vertical load") may be calculated using a transfer function, and an example of calculation using the transfer function will be described as follows.

Figure 4:
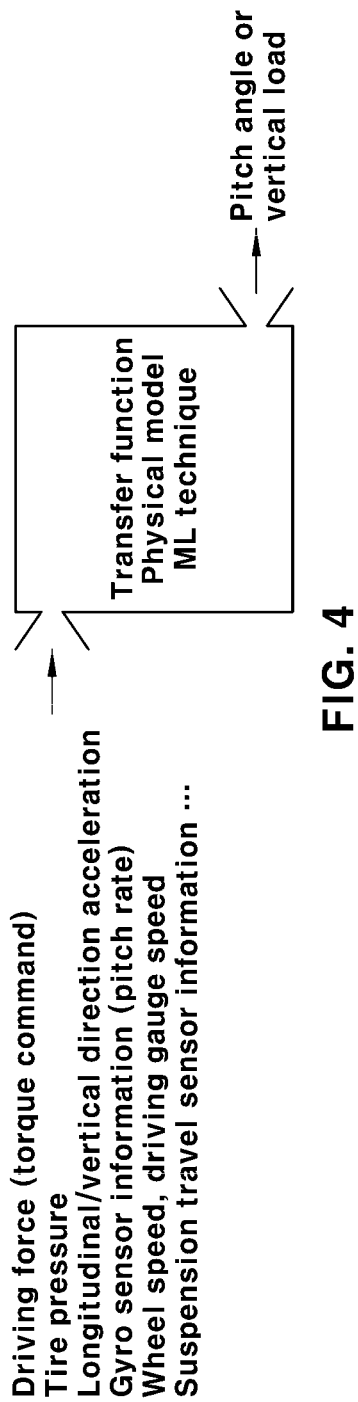
FIG. 4 is a diagram illustrating that a pitch angle and a vertical load are able to be calculated using a transfer function having information collected from a vehicle as an input in the present disclosure.

FIG. 4 is a diagram illustrating that a pitch angle and a vertical load are able to be calculated using a transfer function having information collected from a vehicle as input. In the embodiment of the present disclosure, the transfer function may take the following form.

First, a transfer function having driving force information as an input and having pitch angle information as an output and a transfer function having pitch angle information as an input and having vertical load information as an output may be used. Here, the driving force information may be a torque command configured to control the driving device and, specifically, may be a basic torque command determined by the controller.

Alternatively, a transfer function having driving force information as an input and having vertical load information as an output and a transfer function having tire pressure information detected by a tire pressure sensor as an input and having vertical load information as an output may be used.

Alternatively, a transfer function having vehicle acceleration information detected by a longitudinal acceleration sensor or a vertical acceleration sensor installed in the vehicle as an input and having pitch angle or vertical load information as an output may be used.

Alternatively, a transfer function having pitch angle change rate (pitch rate) information acquired by a gyro sensor (pitch rate sensor) as an input and having pitch angle or vertical load information as an output may be used. Alternatively, a transfer function having information on a wheel speed sensor or a drive system speed sensor as an input and having pitch angle or vertical load information as an output may be used. Here, the driving gauge speed may be a drive speed (motor speed) or a drive shaft speed.

Alternatively, a transfer function having information detected by a suspension travel sensor as an input and having pitch angle or vertical load information as an output may be used. Alternatively, a transfer function using at least two of the above-mentioned input parameters as an input and using pitch angle or vertical load information as an output may be used.

Here, the transfer function may be set to calculate the pitch angle or vertical load using a data-based optimization technique, a numerical solution, or the like. Alternatively, a physical model-based transfer function may be constructed and used, or a learning technique may even be used in order to obtain the transfer function. The transfer function may be implemented as a processor, either hardware or software. Furthermore, an algorithm having the above input and output may be constructed using various machine learning techniques besides the transfer function.

Meanwhile, the first controller 20 determines a basic torque command of the driving device 40 for driving the vehicle from the vehicle operation information and determines the final torque command from the basic torque command on the basis of the pitch angle and vertical load information obtained from a sensor signal or obtained by estimation, in the vehicle, thereby outputting the final torque command.

The basic torque command is a torque command of the driving device 40 that is determined and generated on the basis of the vehicle driving information collected during running from an ordinary vehicle, and the first controller 20 may be a controller (for example, a vehicle controller, a hybrid controller) configured to generate a torque command of the driving device on the basis of the vehicle driving information in an ordinary vehicle.

A method of determining and generating a basic torque command for controlling the operation of the driving device 40 in an ordinary vehicle and a process thereof are well-known in the art, and thus a detailed description thereof will be omitted.

When the final front-wheel torque command and the final rear-wheel torque command are determined and output by the first controller 20, according to the final front-wheel torque command and the final rear-wheel torque command, the operation of the front-wheel driving device and the rear-wheel driving device 40 is controlled by the second controller 30, and accordingly, while the power of each driving device 40 controlled above is transferred to the front- and rear-wheels 60, which are driving wheels, through the reducer 50, the vehicle becomes capable of being driven.

The second controller 30 is a controller configured to receive the final front-wheel torque command and the final rear-wheel torque command output from the first controller 20 and to control, according to the received final front-wheel torque command and the final rear-wheel torque command, the operation of the front-wheel driving device and the rear-wheel driving device 40 and may be a motor control unit (MCU) configured to drive a motor that is the driving device 40 through an inverter according to a torque command and control the driving of the motor.

In the above description, the control subject is divided into the first controller and the second controller, but the driving force control process according to the present disclosure may be performed by one integrated control element instead of a plurality of controllers. One control element integrated with a plurality of controllers may be collectively referred to as a controller, and the driving force control process of the present disclosure described below may be performed by the controller. That is, the controller may refer to both the first controller and the second controller.

Hereinafter, a driving force control method performed by the controller will be described in more detail.

After obtaining the pitch angle and vertical load information as described above, the controller performs driving force control on the basis of the obtained pitch angle and vertical load information. In the present disclosure, the pitch angle means a suspension pitch angle, and the vertical load may be divided into a tire vertical load on the front-wheel and a tire vertical load on the rear-wheel. In the following description, the tire vertical load on the front-wheel will be abbreviated as "front-wheel vertical load", and the tire vertical load on the rear-wheel will be abbreviated as "rear-wheel vertical load".

First, in the driving force control process according to the present disclosure, the controller determines the torque upper limit value by an axle from the vertical load information or the vertical load information and the vehicle pitch motion information, and then performs torque limit control so that the torque (front-wheel torque, rear-wheel torque) of the corresponding axle (front-wheel axle, rear-wheel axle) does not exceed the torque upper limit value (driving force upper limit value). Here, the vertical load includes the front-wheel vertical load and the rear-wheel vertical load. In addition, the torque upper limit value by the axle includes the front-wheel torque upper limit value and the rear-wheel torque upper limit value.

In the present disclosure, the front-wheel torque upper limit value is a value determined as a function of the front-wheel vertical load or a function of the front-wheel vertical load and vehicle pitch motion information, and the rear-wheel torque upper limit value is a value determined as a function of the rear-wheel vertical load or a function of the rear-wheel vertical load and vehicle pitch motion information. In the controller, the front-wheel torque upper limit value may be calculated by a preset formula with the front-wheel vertical load or the front-wheel vertical load and vehicle pitch motion information as inputs, and the rear-wheel torque upper limit value may be calculated by a preset formula with the rear-wheel vertical load or the rear-wheel vertical load and vehicle pitch motion information as inputs.

Here, the vehicle pitch motion information may further include a pitch angle change rate (pitch velocity) in addition to the pitch angle, wherein such a pitch angle change rate may also be obtained from the above-described transfer function.

In the case of the e-4WD system, the torque upper limit value by the axle is determined using the corresponding vertical load information by the axle of the front axle and rear axle, and then torque limit control limiting the torque command is performed so that the torque of the axle does not exceed the torque upper limit of the corresponding axle. Here, the torque of the axle is a front-wheel torque command and a rear-wheel torque command, wherein the front-wheel torque command and the rear-wheel torque command is obtained by distributing the final torque command (which is a torque command after correction) according to the power distribution ratio between the front-wheel and the rear-wheel.

In the torque limit control, the front-wheel torque command and the rear-wheel torque command are determined by setting the front-wheel torque upper limit value and the rear-wheel torque upper limit value respectively as maximum values. However, in the torque limit control, when the finally determined torque command does not exceed the torque upper limit value, the torque command is determined as the final torque command as it is, but when the finally determined torque command exceeds the torque upper limit value, the torque upper limit value is determined as the final torque command.

In addition, when the road surface maximum frictional coefficient information exists, the controller may adjust the torque upper limit value by the axle according to a road surface maximum frictional coefficient. That is, the controller calculates the maximum frictional coefficient securing ratio (%) with respect to the high frictional road surface for the driving road surface, and then multiplies the calculated maximum frictional coefficient securing ratio (%) by the previously determined upper torque limit value by the axle to correct the upper torque limit value by the axle. After that, the corrected upper torque limit value by the axle may be used as the final torque upper limit value.

Here, when explaining the maximum frictional coefficient securing ratio (%) compared to the high frictional road surface, in general, the high frictional road surface may be dry asphalt, and the maximum frictional coefficient of the dry asphalt, which is a high frictional road surface, is about 0.9 to 1. Accordingly, the maximum frictional coefficient of the high frictional road surface may be used by being set to 1 which is the maximum frictional coefficient of the dry asphalt.

In addition, a slippery road surface such as a sandy or wet road surface or snowy road is a low frictional road surface, and the maximum frictional coefficient of such a low friction road surface is smaller than that of a high friction road surface. For example, when the maximum frictional coefficient of the driving road surface is 0.3, the maximum frictional coefficient securing ratio of the driving road surface compared to the high frictional road surface having the maximum frictional coefficient 1 is 30%. As such, the maximum frictional coefficient securing ratio of the driving road surface compared to the high frictional road surface may be defined as a percentage value of the maximum frictional coefficient of the driving road surface with respect to the preset maximum frictional coefficient of the high frictional road surface.

As described above, the torque upper limit value by the axle is corrected by multiplying the torque upper limit value by the axle before the correction by the maximum frictional coefficient securing ratio of the driving road surface. Therefore, when the maximum frictional coefficient securing ratio of the driving road surface is 30%, the torque upper limit value by the axle is corrected by multiplying the torque upper limit value by the axle before correction by 0.3 (=30%), and then the corrected torque upper limit value by the axle may be used as the final torque upper limit value.

Figure 5:
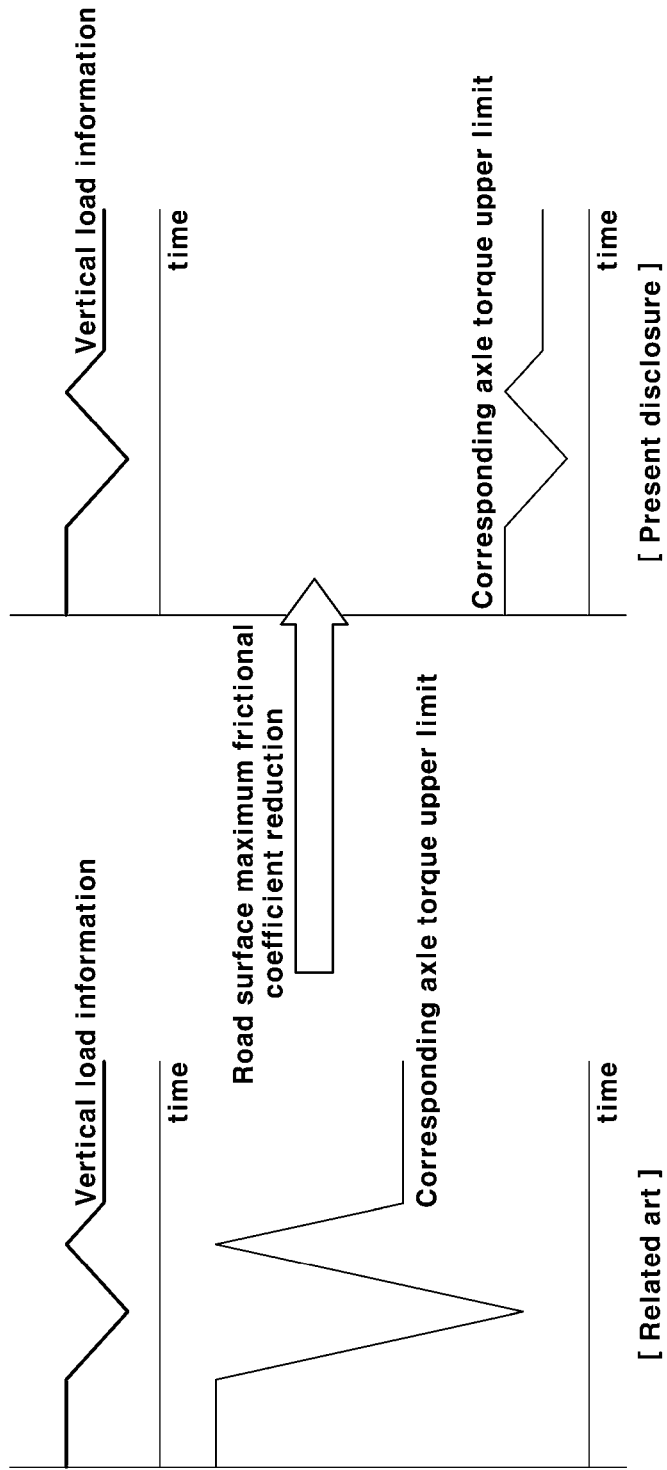
FIG. 5 is a diagram illustrating a state in which a torque upper limit value by an axle is adjusted according to a road surface maximum frictional coefficient in the present disclosure.

FIG. 5 is a diagram illustrating a state in which a torque upper limit value by an axle is adjusted according to a road surface maximum friction coefficient in the present disclosure. A method of judging and determining a frictional coefficient of a road surface on which a vehicle drives on the basis of image information captured by a camera in a vehicle is known, and in the present disclosure, as shown in FIG. 5, even in a state under the same vertical load, the torque upper limit of the corresponding axle may be adjusted according to the maximum frictional coefficient of the road surface.

In addition, in the case of the e-4WD system, in addition to limiting the torque upper limit value (front-wheel torque upper limit value and rear-wheel torque upper limit value) by the axle so that the torque (front-wheel torque command and rear-wheel torque command) by the axle does not exceed, the ratio between the front- and rear-wheels of the upper limit value by the axle may be calculated and used as the power distribution ratio of the front-to-rear-wheels.

Basically, the power distribution ratio for distributing the required torque command (basic torque command) into the front-wheel torque command and the rear-wheel torque command may be determined by the ratio of the front-wheel vertical load and the rear-wheel vertical load. In addition, the front-wheel torque upper limit value and the rear-wheel torque upper limit value may be respectively determined by the front-wheel vertical load and rear-wheel vertical load as inputs by the formula, so the ratio of the front-wheel vertical load and the rear-wheel vertical load may be the same as the ratio of the front-wheel torque upper limit value and the rear-wheel torque upper limit value. Accordingly, the front-rear-wheel power distribution ratio may be determined by the ratio of the front-wheel torque upper limit value and the rear-wheel torque upper limit value.

That is, when, in the controller, front-wheel torque upper limit value is determined from the front-wheel vertical load, and the rear-wheel torque upper limit value is determined from the rear-wheel vertical load, the ratio of the front-wheel torque upper limit value to the rear-wheel torque upper limit value may be the power distribution ratio for the distribution of driving force (torque) between the front- and rear-wheels.

Figure 6:
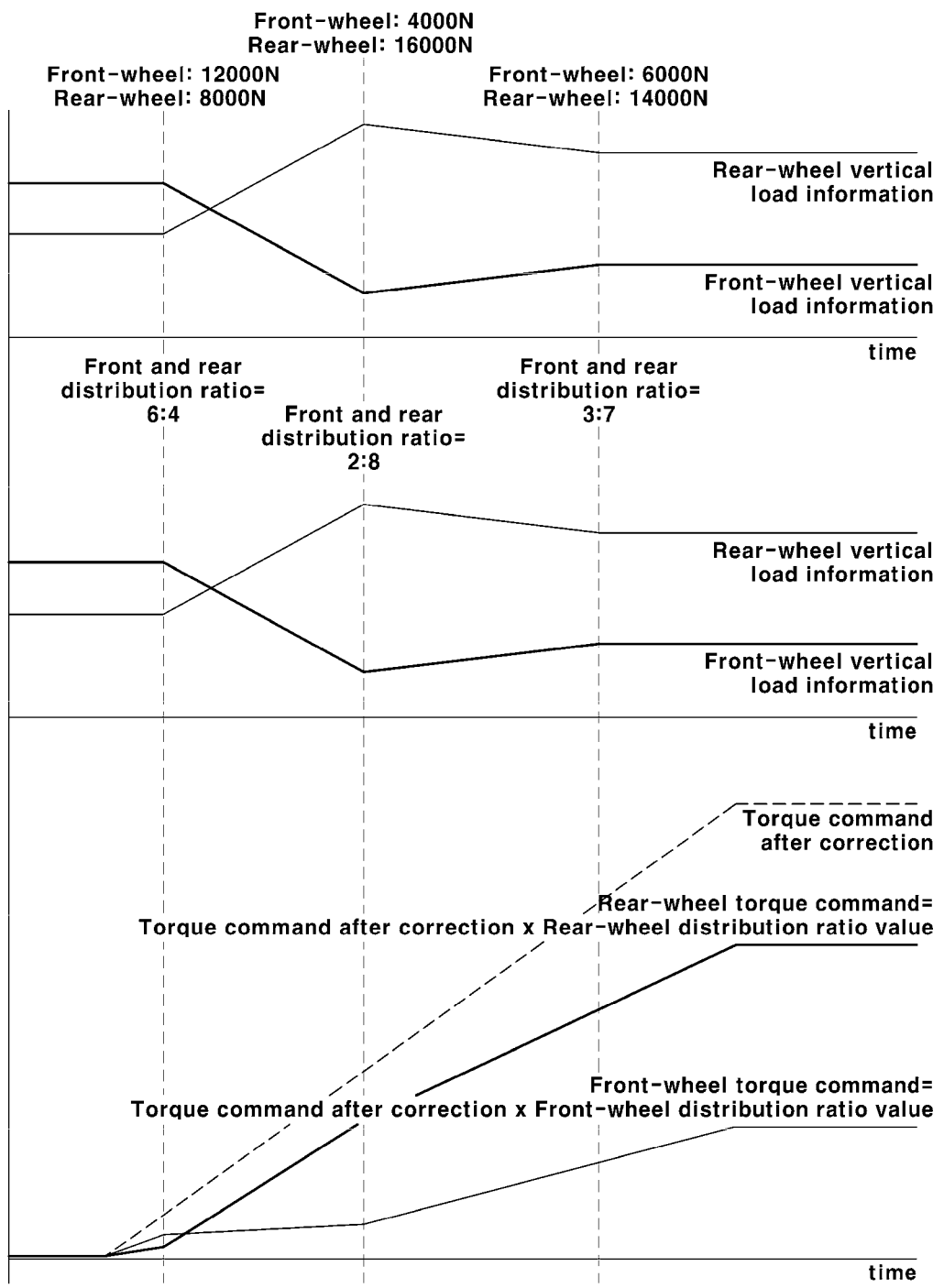
FIG. 6 is a diagram illustrating a state in which a power distribution ratio of front- and rear-wheels is changed in real time according to a vertical load of the front-wheel and a vertical load of the rear-wheel in the present disclosure.

FIG. 6 is a diagram illustrating a state in which a power distribution ratio of front- and rear-wheels is changed in real time according to vertical load information in the present disclosure. In FIG. 6, the "required torque command" is a command value for the driver's requested torque and is a basic torque command determined by the controller (first controller) according to vehicle operation information such as the driver's accelerator pedal input value and the like.

With reference to FIG. 6, it may be seen that the power distribution ratio also changes as the front-wheel vertical load and the rear-wheel vertical load change in real time, and the ratio of the front-wheel vertical load and the rear-wheel vertical load may be determined by the power distribution ratio. In addition, when the power distribution ratio has been determined, the front-wheel torque command may be determined as a value obtained by multiplying the required torque command by the front-wheel distribution ratio value, and the rear-wheel torque command may be determined as a value obtained by multiplying the required torque command by the rear-wheel distribution ratio value.

Here, the sum of the front-wheel distribution ratio value and the rear-wheel distribution ratio value is 1. For example, when the front-rear-wheel power distribution ratio is 6:4, the front-wheel distribution ratio becomes 0.6 and the rear-wheel distribution ratio becomes 0.4. In addition, when the front-rear-wheel power distribution ratio is 2:8, the front-wheel distribution ratio value becomes 0.2 and the rear-wheel distribution ratio becomes 0.8.

Figure 7:
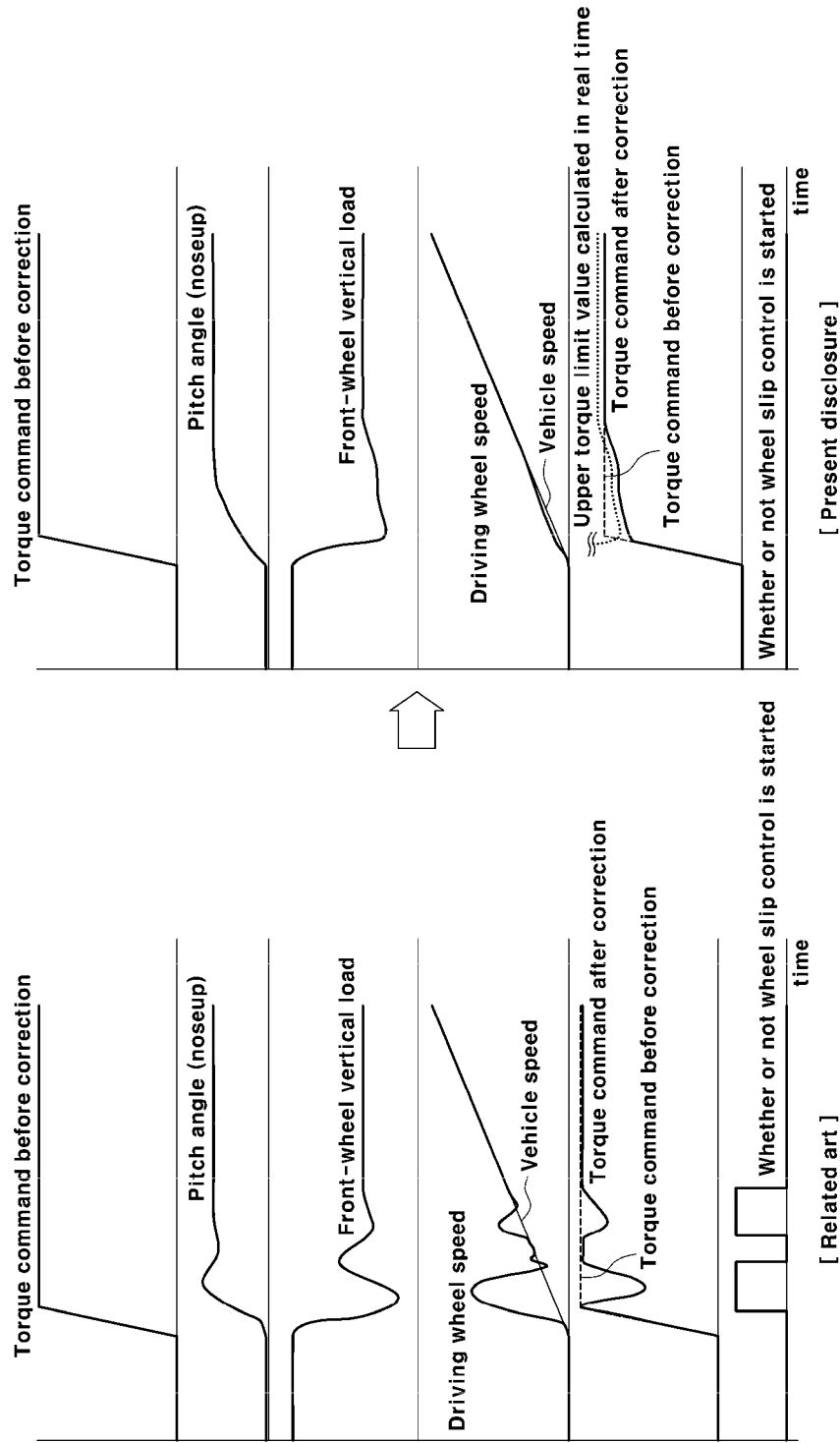
FIG. 7 is a diagram illustrating a comparison between states of conventional wheel slip control and driving force control of the present disclosure.

Next, FIG. 7 is a diagram illustrating a comparison between states of conventional wheel slip control and driving force control of the present disclosure and shows a control status of a front-wheel driving vehicle. There is no particular difference in the driving force control state for the rear-wheels compared to the front-wheels, so the drawings for the rear-wheels will be omitted.

In FIG. 7, "torque command before correction" indicates a front-wheel torque command distributed according to a power distribution ratio from a required torque command (basic torque command) as described with reference to FIG. 6. In addition, the torque command after correction is a torque command corrected on the basis of the torque upper limit value and pitch angle information from the torque command before correction.

In FIG. 7, as real-time change information, during a noseup of a vehicle, pitch angle information, a front-wheel vertical load, a front-wheel speed, and a vehicle speed, and a torque command before correction and a torque command after correction, respectively, are exemplified, and whether or not wheel slip control is started and the like are shown.

According to the conventional control method, the application of the torque command causes a noseup phenomenon of the vehicle, thereby reducing the vertical load on the front-wheel. However, the vertical load may not be simply reduced and also be reduced while repeating descending and ascending due to the mechanical characteristics of the vehicle.

As a result, slip in which the wheel speed of the driving wheel (front-wheel) rises momentarily occurs. When the slip occurs, while the wheel slip control is being performed, the wheel speed converges, and again the slip generation, wheel slip control, and wheel speed convergence may be repeated.

As described above, according to the related art, a situation in which wheel slip control needs to be performed several times may occur.

On the other hand, when a method for controlling driving force of a vehicle according to the present disclosure is applied, front-wheel vertical load information is obtained through a transfer function, a model-based or learning model, or the like, and the occurrence of wheel slip may be prevented in advance by correcting the driving force in real time on the basis of the obtained front-wheel vertical load information. Accordingly, wheel slip control may not be performed. In addition, since the torque upper limit value that is proportional to the vertical load or is correspondingly changed to the vertical load may be calculated in real time and used when performing the torque limit, it is possible to always maintain the torque lower than the upper torque limit value. FIG. 7 may be an example in which the torque (driving force) upper limit is calculated on the basis of only the vertical load information and then used. Differently from the example of FIG. 7, the upper torque limit value may also be calculated using vehicle pitch motion information, that is, the pitch angle and the pitch angle change rate (pitch speed) together. Here, the pitch angle change rate may be obtained from the transfer function similarly to the pitch angle or vertical load information.

By using such a method, it is possible to perform pitch angle attenuation control such as a control to decrease the required torque command when the pitch angle is increased, a control to increase the required torque command when the pitch angle is decreased, and the like. A method that simultaneously considers the pitch angle, pitch speed, and vertical load may be performed as follows.

First, the front-wheel torque (driving force) upper limit value and rear-wheel torque upper limit value may be calculated as in Equations 1 and 2 below.

$$\text{Front-wheel torque upper limit value} = \sigma 1 \times \text{front-wheel vertical load} - \sigma 2 \times \text{pitch angle} - \sigma 3 \times \text{pitch angle change rate} \quad \text{[Equation 1]}$$

$$\text{Rear-wheel torque upper limit value} = \sigma 1 \times \text{Rear-wheel vertical load} - \sigma 2 \times \text{Pitch angle} - \sigma 3 \times \text{Pitch angle change rate} \quad \text{[Equation 2]}$$

wherein $\sigma 1$ is a parameter value interlocked with the information on the maximum frictional coefficient of the road surface and has the effect that converts the vertical load information into the torque upper limit value. When the road surface maximum frictional coefficient information is not used, a preset coefficient is used for unit correction and matching up between the vertical load (unit: N) and torque (driving force) (unit: Nm).

$\sigma 2$ and $\sigma 3$ are coefficients that determine what amount of the pitch angle and pitch angle change rate are to be reflected in the torque upper limit value, respectively, and these also use preset values. In addition, the coefficient of Equation 1 and the coefficient of Equation 2 may be dualized. That is, the coefficient $\sigma 2$ of Equation 1 and the coefficient $\sigma 2$ of Equation 2 may have the same value, or different values as needed, and the coefficient $\sigma 3$ of Equation 1 and the coefficient $\sigma 3$ of Equation 2 may also have the same value or different values.

When the front-wheel torque upper limit value and the rear-wheel torque upper limit value are determined as described above, the controller compares the front-wheel torque command before correction and the front-wheel torque upper limit value with each other and performs torque limit control to limit the torque command so as not to exceed the front-wheel torque upper limit value.

That is, a smaller value of the front wheel torque command before correction and the front wheel torque upper limit value is determined as the final front-wheel torque command, that is, the front-wheel torque command after correction, and a smaller value of the rear-wheel torque command before correction and the rear wheel torque upper limit value is determined as the final rear-wheel torque command, that is, the rear-wheel torque command after correction.

Of course, when the front-wheel torque command before correction and the front torque upper limit value, and the rear-wheel torque command before correction and the rear-wheel torque upper limit value are the same value, respectively, the front- and rear-wheel torque commands before correction are determined as the final front- and rear-wheel torque commands. As described above, the final torque command by the axle may be determined on the basis of the torque command by the axle (front- and rear-wheels) before correction and the torque upper limit by the axle (front- and rear-wheels).

In addition, in Equations 1 and 2, each element on the right side is not limited to being used for determining the torque upper limit value by the axle (front-wheel axle and rear-wheel axle) and may be used to correct an actual torque (driving force). That is, the torque command after correction may be calculated as in Equations 3 and 4 below. The torque command after correction calculated according to Equations 3 and 4 is used for controlling the torque (driving force) of the driving device, whereby the driving force control in which the vehicle tire vertical load information and pitch information are reflected may be performed.

Front-wheel torque command after correction=Front-wheel torque command before correction+σ1×(Basic front-wheel vertical load−Current front-wheel vertical load)−σ2×Pitch angle−σ3×Pitch angle change rate   [Equation 3]

Rear-wheel torque command after correction=Rear-wheel torque command before correction+σ1×(Basic rear-wheel vertical load−Current rear-wheel vertical load)−σ2×Pitch angle−σ3×Pitch angle change rate   [Equation 4]

wherein the basic front-wheel vertical load is representative vertical load information on the vehicle that is measured in advance when the vehicle is in a state and the like of being stopped on the flat ground. In addition, the current vertical load is vertical load information calculated in real time through the method such as the transfer function described above and the like.

On the other hand, instead of the method of controlling the driving force on the basis of the torque upper limit by the axle calculated by Equations 1 and 2 and of the method of controlling the driving force using the torque command after correction by the axle calculated by Equations 3 and 4, it is also possible to apply a method in which each of the two methods is divided by elements and the two methods are complexly mixed together.

That is, after calculating the torque upper limit by the axle (front- and rear-wheels) using Equations 5 and 6, the torque limit control for limiting the front-wheel torque command and the rear-wheel torque command may be performed using the calculated torque upper limit value by the axle.

Front-wheel torque upper limit=σ1×front-wheel vertical load   [Equation 5]

Rear-wheel torque upper limit=σ1×rear-wheel vertical load   [Equation 6]

In addition, after calculating the front-wheel torque command after correction and the rear-wheel torque command after correction using Equations 7 and 8, the operation of the front-wheel driving device and the rear-wheel driving device may be controlled by using the calculated front-wheel torque command after the correction and the rear-wheel torque command after the correction.

Front-wheel torque command after correction=Front-wheel torque command after applying the torque upper limit of Equation 5−σ2×Pitch angle−σ3×Pitch angle change rate   [Equation 7]

Rear-wheel torque command after correction=Rear-wheel torque command after applying the torque upper limit of Equation 6−σ2×Pitch angle−σ3×Pitch angle change rate   [Equation 8]

In this way, the method for controlling driving force according to the present disclosure has been described in detail. According to the method for controlling driving force of a vehicle according to the present disclosure, it is possible to perform driving force reduction control using real-time vertical load information before wheel slip occurs, and excessive noseup phenomenon of the vehicle may be prevented therethrough. In addition, driving force control in consideration of real-time pitch angle mechanics may be implemented, and the noseup overshoot phenomenon (fluctuation) may be prevented therethrough, and in particular, it is more effective when applied to Sports Utility Vehicle (SUV) with a long distance between the center of gravity and the center of pitch.

Although the embodiment of the present disclosure has been described in detail above, the scope of the present disclosure is not limited thereto, and various modifications and improvements made by those skilled in the art using the basic concept of the present disclosure as defined in the following claims also included in the scope of the present disclosure.

What is claimed is:

1. A method for controlling driving force of a vehicle, the method comprising:
    determining, by a controller, a basic torque command on a basis of vehicle operation information collected while the vehicle is traveling;
    obtaining, by the controller, tire vertical load information and vehicle pitch motion information in real time on a basis of information collected from the vehicle while the vehicle is traveling;
    determining, by the controller, a final torque command using the determined basic torque command and the obtained tire vertical load information and vehicle pitch motion information; and
    controlling, by the controller, a torque output of a driving device configured to drive the vehicle according to the determined final torque command.

2. The method of claim 1, wherein the determining of the final torque command comprises:
    determining, by the controller, a front-wheel torque upper limit value and a rear-wheel torque upper limit value using the tire vertical load information;
    determining, by the controller, a front-wheel torque command and a rear-wheel torque command distributed according to a power distribution ratio determined from the basic torque command; and
    determining, by the controller, a smaller value of the determined front-wheel torque command and the determined front-wheel torque upper limit value as a final front-wheel torque command for controlling a torque output of a front-wheel driving device, and determining, by the controller, a smaller value of the determined rear-wheel torque command and the determined rear-wheel torque upper limit value as a final rear-wheel torque command for controlling a torque output of a rear-wheel driving device.

3. The method of claim 2, wherein the tire vertical load information comprises a front-wheel vertical load and a rear-wheel vertical load, and
   wherein in the determining of the front-wheel torque command and the rear-wheel torque command, the power distribution ratio is determined to be a ratio of the front-wheel vertical load to the rear-wheel vertical load.

4. The method of claim 2, wherein in the determining of the front-wheel torque command and the rear-wheel torque command, the power distribution ratio is determined to be a ratio of the determined front-wheel torque upper limit value to the determined rear-wheel torque upper limit value.

5. The method of claim 2, wherein the tire vertical load information comprises a front-wheel vertical load and a rear-wheel vertical load, and the controller is configured to determine:
   the front-wheel torque upper limit value from the front-wheel vertical load and the obtained vehicle pitch motion information; and
   the rear-wheel torque upper limit value from the rear-wheel vertical load and the obtained vehicle pitch motion information.

6. The method of claim 5, wherein the vehicle pitch motion information comprises a vehicle pitch angle that is a pitch direction angle of the vehicle, and a pitch angle change rate that is a rate of change of the vehicle pitch angle,
   wherein the front-wheel torque upper limit value and the rear-wheel torque upper limit value are determined by Equations 1 and 2, respectively, below:

$$\text{Front-wheel torque upper limit} = \sigma1 \times \text{front-wheel vertical load} - \sigma2 \times \text{pitch angle} - \sigma3 \times \text{pitch angle change rate}, \quad \text{[Equation 1]}$$

$$\text{Rear-wheel torque upper limit} = \sigma1 \times \text{Rear-wheel vertical load} - \sigma2 \times \text{Pitch angle} - \sigma3 \times \text{Pitch angle change rate}, \quad \text{[Equation 2]}$$

wherein $\sigma1$ is a parameter value correspondingly determined to a maximum frictional coefficient of a road surface, and $\sigma2$ and $\sigma3$ are values preset to the controller.

7. The method of claim 1, wherein the determining of the final torque command comprises:
   determining, by the controller, a front-wheel torque command and a rear-wheel torque command distributed according to a power distribution ratio determined from the basic torque command; and
   determining, by the controller, a final front-wheel torque command for controlling a torque output of a front-wheel driving device and a final rear-wheel torque command for controlling a torque output of a rear-wheel driving device using the determined front-wheel torque command, the determined rear-wheel torque command, the obtained tire vertical load information, and the obtained vehicle pitch motion information.

8. The method of claim 7, wherein the tire vertical load information comprises a front-wheel vertical load and a rear-wheel vertical load,
   wherein in the determining of the front-wheel torque command and the rear-wheel torque command, the power distribution ratio is determined to be a ratio of the front-wheel vertical load to the rear-wheel vertical load.

9. The method of claim 7, wherein the tire vertical load information comprises a front-wheel vertical load and a rear-wheel vertical load,
   wherein the vehicle pitch motion information comprises a vehicle pitch angle that is a pitch direction angle of the vehicle, and a pitch angle change rate that is a rate of change of the vehicle pitch angle, and
   wherein the final front-wheel torque command and the final rear-wheel torque command are determined by Equations 3 and 4, respectively, below:

$$\text{Final front-wheel torque command} = \text{Front-wheel torque command before correction} + \sigma1 \times (\text{Basic front-wheel vertical load} - \text{Current front-wheel vertical load}) - \sigma2 \times \text{Pitch angle} - \sigma3 \times \text{Pitch angle change rate}, \quad \text{[Equation 3]}$$

$$\text{Final rear-wheel torque command after correction} = \text{Rear-wheel torque command before correction} + \sigma1 \times (\text{Basic rear-wheel vertical load} - \text{Current rear-wheel vertical load}) - \sigma2 \times \text{Pitch angle} - \sigma3 \times \text{Pitch angle change rate}, \quad \text{[Equation 4]}$$

wherein $\sigma1$ is a parameter value correspondingly determined to a maximum frictional coefficient of a road surface, and $\sigma2$, $\sigma3$, the basic front-wheel vertical load, and the basic rear-wheel vertical load are values preset to the controller.

10. The method of claim 1, wherein the determining of the final torque command comprises:
    determining, by the controller, a front-wheel torque upper limit value and a rear-wheel torque upper limit value using the tire vertical load information;
    determining, by the controller, a front-wheel torque command and a rear-wheel torque command distributed according to a power distribution ratio determined from the basic torque command;
    determining, by the controller, a smaller value of the determined front-wheel torque command and the determined front-wheel torque upper limit value as a front-wheel torque command before correction, and determining, by the controller, a smaller value of the determined rear-wheel torque command and the determined rear-wheel torque upper limit value as a rear-wheel torque before correction; and
    determining, by the controller, a final front-wheel torque command for controlling a torque output of a front-wheel driving device and a final rear-wheel torque command for controlling a torque output of a rear-wheel driving device by using the determined front-wheel torque command before correction, the determined rear-wheel torque command before correction, the obtained tire vertical load information, and the obtained vehicle pitch motion information.

11. The method of claim 10, wherein, in the controller, the front-wheel torque upper limit value and the rear-wheel torque upper limit value are determined by Equations 5 and 6, respectively, below:

$$\text{Front-wheel torque upper limit} = \sigma1 \times \text{front-wheel vertical load}, \quad \text{[Equation 5]}$$

$$\text{Rear-wheel torque upper limit} = \sigma1 \times \text{rear-wheel vertical load}, \quad \text{[Equation 6]}$$

wherein $\sigma1$ is a parameter value correspondingly determined to a maximum frictional coefficient of a road surface.

12. The method of claim 10, wherein the tire vertical load information comprises a front-wheel vertical load and a rear-wheel vertical load, wherein the vehicle pitch motion information comprises a vehicle pitch angle that is a pitch direction angle of the vehicle, and a pitch angle change rate that is a rate of change of the vehicle pitch angle, and wherein the final front-wheel torque command and the final rear-wheel torque command are determined by Equations 7 and 8, respectively, below:

Final front-wheel torque command=Front-wheel torque command after applying the torque upper limit of Equation 5−σ2×Pitch angle−σ3×Pitch angle change rate,     [Equation 7]

Final rear-wheel torque command=Rear-wheel torque command after applying the torque upper limit of Equation 6−σ2×Pitch angle−σ3×Pitch angle change rate,     [Equation 8]

wherein σ1 is a parameter value as determined according to a maximum frictional coefficient of a road surface, and σ2 and σ3 are values preset to the controller.

13. The method of claim 1, wherein the vehicle pitch motion information comprises a vehicle pitch angle that is a pitch direction angle of the vehicle and a pitch angle change rate that is a rate of change of the vehicle pitch angle.

14. The method of claim 13, wherein the vehicle pitch angle is a suspension pitch angle that is an angle in the vehicle pitch direction according to strokes of a front-wheel suspension and a rear-wheel suspension.

15. The method of claim 1, wherein, the obtaining of the tire vertical load information and the vehicle pitch motion information in real time includes obtaining, by a transfer function preset to the controller, the tire vertical load information and the vehicle pitch motion information, wherein the transfer function uses the information collected from the vehicle as input.

16. The method of claim 1, wherein the determining of the final torque command comprises:

determining, by the controller, a driving wheel torque upper limit value using tire vertical load information of a driving wheel that is any one of a front-wheel and a rear-wheel of the vehicle;

comparing, by the controller, the determined basic torque command and the determined driving wheel torque upper limit value; and determining, by the controller, the basic torque command as the final torque command when the basic torque command is no greater than the driving wheel torque upper limit value, and determining, by the controller, the driving wheel torque upper limit value as the final torque command when the basic torque command exceeds the driving wheel torque upper limit value.

\* \* \* \* \*